Feb. 15, 1944.     J. R. UDDENBORG     2,341,830
PLANT THINNING WHEEL
Filed March 2, 1942

Inventor
Johan R. Uddenborg,
By J. Stanley Burch
Attorney

Patented Feb. 15, 1944

2,341,830

UNITED STATES PATENT OFFICE 2,341,830

PLANT THINNING WHEEL

Johan R. Uddenborg, Chicago, Ill.

Application March 2, 1942, Serial No. 433,082

1 Claim. (Cl. 97—213)

This invention relates to plant thinning machines, and has more particular reference to improvements in the type of rotating plant thinning member or wheel shown in my prior United States Letters Patent No. 1,998,745, dated April 23, 1935.

The rotating thinning member disclosed in my above mentioned patent embodies knives which are twisted about their axes to present the sharpened edges of the blades to the soil. However, it is desirable to vary the positions of the knives so as to change the angle at which the plant cutting blades of the knives are disposed relative to the axis of rotation of the thinning member, whereby the width of cuts made by said knives may be varied as desired. Accordingly, the primary object of the present invention is to provide improved means for clamping the knives of the thinning member to the knife carrying plate, whereby said knives may be rotarily adjusted about the longitudinal axes of the shanks or hafts of said knives. In this way, the angle at which the plant cutting blades of the knives are arranged relative to the axis of rotation of the thinning member may be varied to similarly vary the widths of cuts made by the knives.

A further object is to provide clamping and adjusting means for the knives which will securely fasten the knives in adjusted position and which embodies extreme simplicity and durability of construction.

A further object is to provide knife clamping means by means of which the adjustment of the knives may be conveniently and quickly accomplished.

Other objects of the invention will become apparent as the nature of the invention is better understood, and the same consists in the novel form, combination and arrangement of parts hereinafter more fully described, shown in the accompanying drawing and claimed.

Figure 1:
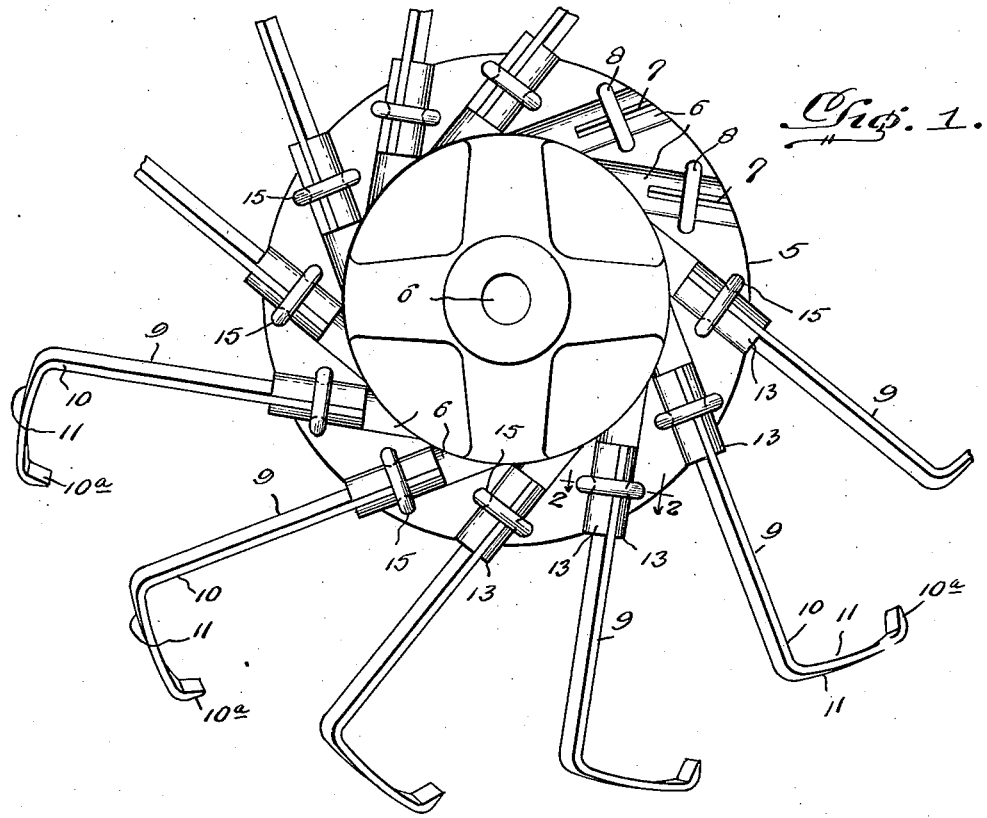
Figure 1 is a fragmentary side elevational view of a rotating thinning member constructed in accordance with the present invention.
Figure 3:
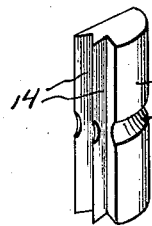
Figure 3 is an enlarged perspective view of one of the clamping blocks shown in Figure 2.
Figure 5:
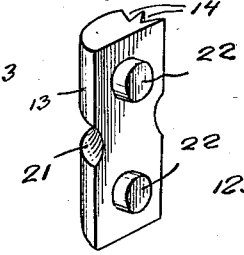
Fig. 5 is an enlarged perspective view of the other clamping block shown in Fig. 2.

Referring in detail to the drawing, the present rotating thinning member includes a suitable knife carrying plate or disk 5 having a central opening 6 to receive the shaft which carries and drives the thinning member as disclosed in my above mentioned patent. The plate or disk 5 is provided on one face of its margin with a circular series of uniformly spaced grooves 6 which are preferably disposed tangentially of said plate or disk 5 and are provided with central longitudinal ribs 7, preferably of V-shape as shown. Openings or elongated slots 8 are provided through the plate or disk 5 entirely across and intermediate the ends of each groove 6 to receive the ends of U-bolts employed for clamping the knives to the disk or plate 5 as will presently become apparent.

Figure 2:
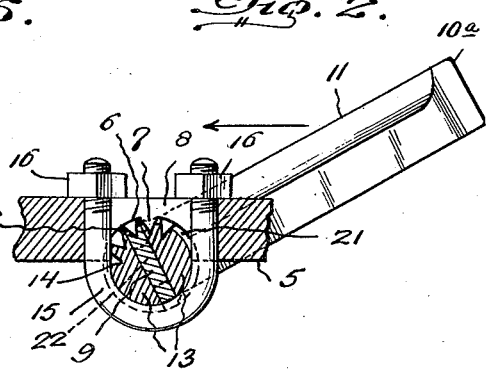
Figure 2 is an enlarged fragmentary section taken on line 2—2 of Figure 1.
Figure 4:
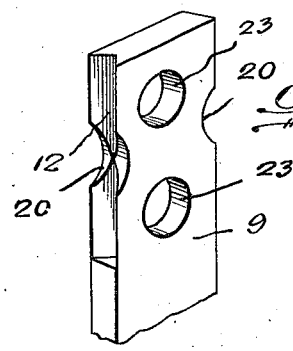
Figure 4 is a fragmentary perspective view showing an end portion of the shank or haft of one of the knives.

Each knife consists of a shank or haft 9, a pair of spaced substantially parallel sharpened soil slicing blades 10 and 10a, and a plant cutting blade 11 connecting said slicing blades. The inner end of each knife shank or haft 9 is provided in one edge with a longitudinal V-shape groove 12, and disposed at opposite sides of each knife shank or haft 9 at the inner end thereof are clamping blocks 13 of substantially half round form and provided with a plurality of longitudinal V-shape grooves 14. The grooves 12 and 14 are arranged so that when the blocks 13 are disposed on opposite sides of the haft 9, a series of uniformly spaced grooves are presented adjacent the plate or disk 5 for selective reception of the associated rib 7 when said shank or haft 9 and the associated blocks 14 are seated in the adjacent groove 6. This is clearly illustrated in Figure 2, and the assembly of knife and blocks 13 is held to the plate or disk 5 within the associated groove 6 by means of a U-bolt 15 passing around the assembly and having the stems thereof pass through the adjacent slot 8. Nuts 16 are threaded upon the ends of the bolts 15 so that when they are tightened the assembly will be firmly clamped to the disk or plate 5 with the rib 7 engaging in one of the grooves 12 or 14. By rotating the assembly about the longitudinal axis of the knife shank or haft, the angle at which the plant cutting blade 11 is disposed relative to the axis of rotation of the thinning member may be varied so as to vary the width of the cut of the knife. It will be seen that by loosening the nuts 16 so that the knife and assembled blocks 13 may be disengaged from the rib 7, the assembly may be rotarily adjusted to the desired position and then secured in this position by tightening the nuts again. When the nuts are tightened, the knife will be firmly and securely clamped in adjusted position. In order to positively prevent longitudinal displacement of each knife and the associated blocks 13 relative to the associated U-bolt 15, the latter is seated in circumferential or transverse grooves 20 and 21 provided respectively in the edges of the haft 9 and in the outer surfaces of blocks 13. Also, haft 9 of each knife and its associated blocks 13 are keyed together, against relative longitudinal displacement, by means of lugs 22 on the inner faces of said blocks and arranged to fit in openings 23 of the associated haft 9.

What I claim as new is:

A rotating plant thinning member of the character described comprising a knife carrying disk having a circular series of uniformly spaced grooves in one face of the margin thereof and provided longitudinally of and within each groove with a rib, a plurality of spaced knives, one associated with each of said grooves, said knives each comprising a pair of spaced substantially parallel sharpened soil slicing blades and a plant cutting blade connecting said soil slicing blades, the shank of each knife having a longitudinal groove in one edge thereof, clamping blocks upon opposite sides of each knife shank and each provided with a plurality of longitudinal grooves, said grooves being adapted for selective reception of the associated rib of the knife carrying disk whereby each knife may be rotarily adjusted about the longitudinal axis of its shaft for varying the angle of its plant cutting blade relative to the axis of rotation of the thinning member, and a U-bolt to clamp each knife and the associated blocks to said disk with the rib of the adjacent groove engaged in a groove of the associated knife or blocks, said disk having a slot to receive the ends of each U-bolt, and the edges of the shank of each knife and the associated blocks having transverse grooves in which the intermediate portion of the associated U-bolt is seated.

JOHAN R. UDDENBORG.